UNITED STATES PATENT OFFICE.

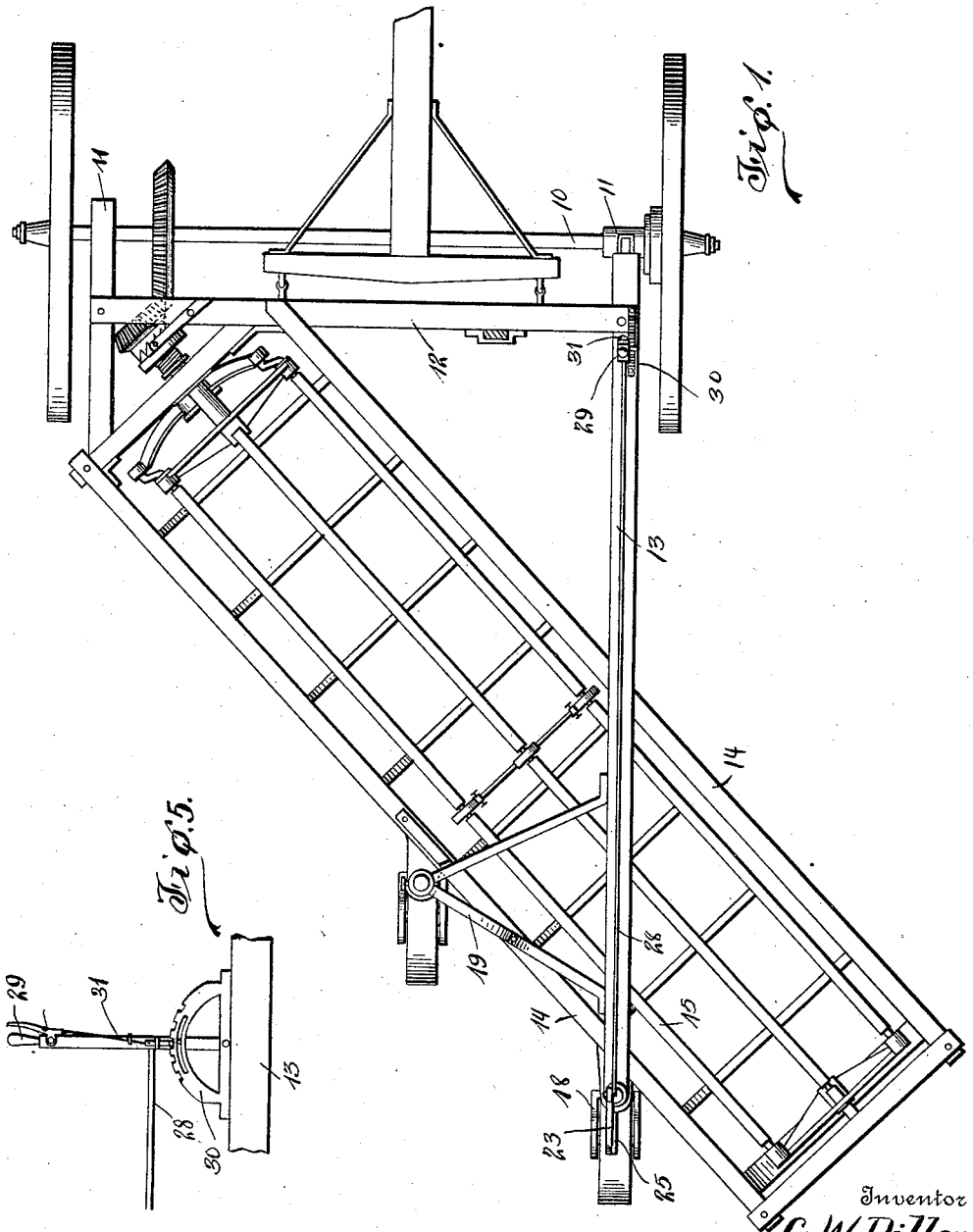

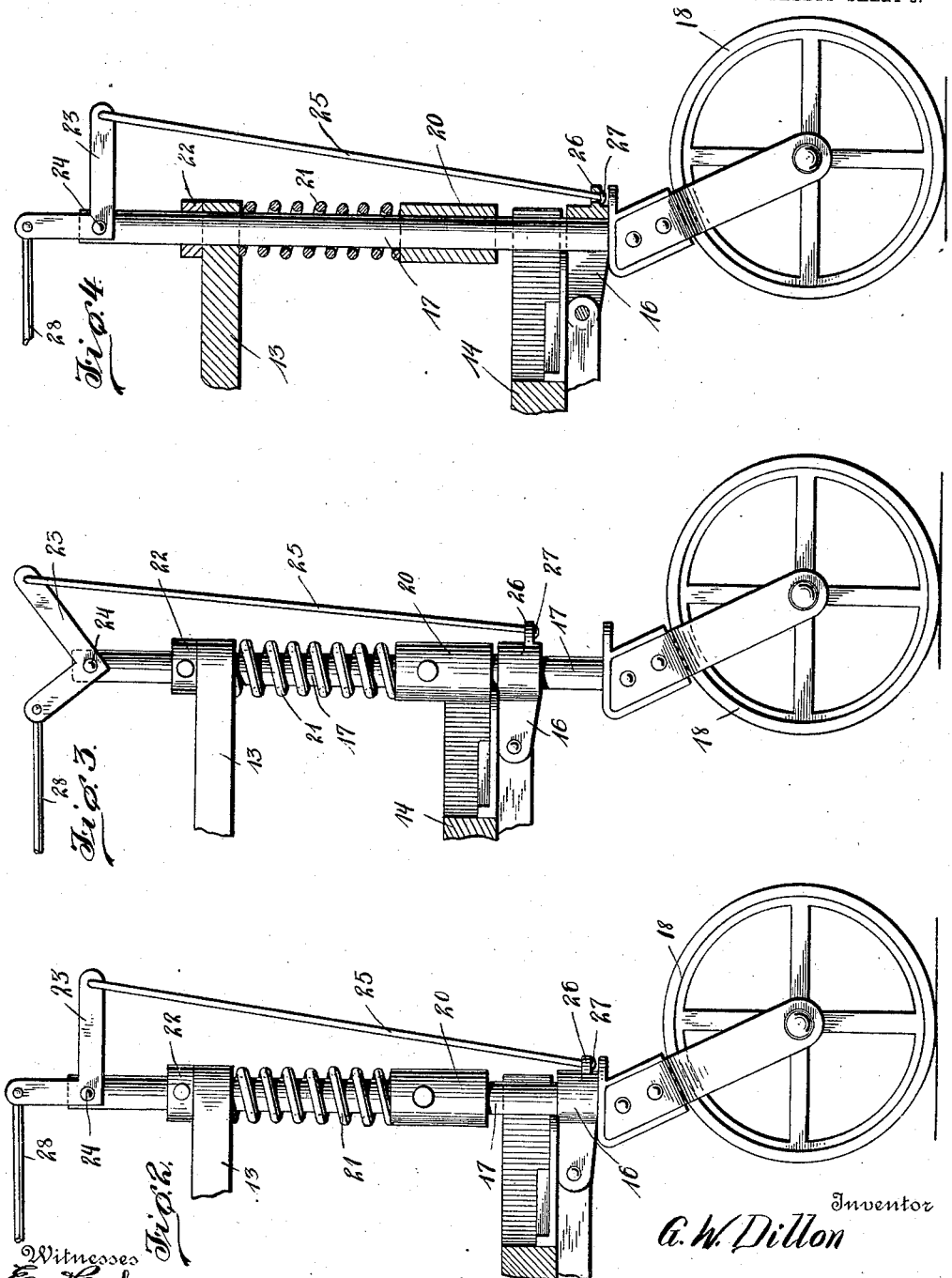

GEORGE W. DILLON, OF NEW LOTHROP, MICHIGAN.

ATTACHMENT FOR RAKES.

1,049,823.      Specification of Letters Patent.      Patented Jan. 7, 1913.

Application filed September 18, 1911. Serial No. 649,892.

*To all whom it may concern:*

Be it known that I, GEORGE W. DILLON, a citizen of the United States, residing at New Lothrop, in the county of Shiawassee, State of Michigan, have invented certain new and useful Improvements in Attachments for Rakes; and I do hereby declare the following to be a full, clear, and exact description of the invention, such as will enable others skilled in the art to which it appertains to make and use the same.

This invention relates to side delivery rakes, more particularly to means for lifting the rake frame so as to promote the effective working of the device upon uneven ground.

An object of the present invention is to provide a lifting mechanism which may be applied to most of the side delivery rakes in use and in operation will lift the rake frame bodily upon the caster wheel stems as guides.

A further object of the invention is to provide an extremely simple lifting device which will embody substantially a bell crank lever, two links, and a shifting lever.

With the above objects in view the invention consists in certain novel details of construction and combination of parts hereinafter fully described and claimed, it being understood that various modifications may be made in the minor details of construction within the scope of the appended claim.

In the accompanying drawings forming part of this specification:—Figure 1 is a plan view of a conventional side delivery rake showing my lifting device applied thereto. Fig. 2 is a detail view in elevation of the device in normal position. Fig. 3 is a detail view in elevation of the device in operative position. Fig. 4 is a view in elevation with parts in section of the device as shown in Fig. 2. Fig. 5 is a fragmentary view in elevation showing the operating lever.

Referring now to the drawing in which like characters of reference designate similar parts, 10 designates a wheeled axle upon which are mounted bearings 11, and upon these bearings is supported a substantially L-shaped main frame 12, the main beam 13 of which extends rearwardly from the axle and serves to support the outer end of a side delivery harrow tooth frame 14. This frame is pivotally secured to the main frame in the usual manner and supports the rotary harrow tooth bars 15 as usual in devices of this character.

Secured to one of the side bars of the harrow tooth frame 14 are bearings 16 through which the stems 17 of caster wheels 18 slidingly fit, the stem of one caster wheel projecting through an opening in the main beam 13 and the stem of the other caster wheel projecting through an opening in a substantially V-shaped brace 19 carried by the main beam as shown. Collars 20 fixed on the stems above the bearings 16 form supports or abutments for helical springs 21 which are seated on the stems and these springs forming yielding cushions against which the free end of the main beam 13 and brace rest. Collars 22 are fixed to the stems above the beam and brace to limit upward movement of the beam and brace when the parts impinge forcibly against the springs during passage of the machine over rough ground. The collars 20 limit lifting movement of the harrow tooth frame 14 under the action of the manually controlled means which will be presently described.

The above described parts are of the usual and well known construction and form no part of the present invention which rather consists in means attachable to the stem of one of the caster wheels and also to the above mentioned bearing 16 on the harrow tooth frame, and operating to lift the said frame or lower the said frame vertically upon the caster wheel stem.

The lifting means comprising the subject-matter of this invention consists of a bell crank lever 23 pivoted at its elbow as shown at 24 to the upper end of one of the caster wheel stems. Pivotally connected at its upper end to one leg of the bell crank lever is a link 25 the lower end of which is loosely connected to the bearings 16 which encircles the stem, the preferable manner of attaining this end being to pass the lower end of link loosely through an eye 26 formed integral with the bearing and then head up the link as shown at 27 to prevent its accidental withdrawal. Any other means of attachment may be utilized without departing from the spirit of this invention. A link 28 is pivotally connected to the other leg of the bell crank lever and extends forwardly along the main beam 13 being then terminally connected to a lever 29 which is pivoted at its lower end to the main beam 13. A notched segment 30 is fixed to the beam, and a spring pressed latch 31 carried by the lever operatively engages this notched segment in the usual manner for locking the lever in stationary position.

It is now clear that insomuch as the caster wheel stems remain substantially stationary relatively to the main beam, the frame 14 will be moved vertically upon the caster wheel stem when the lever 29 is shifted. In this manner the harrow teeth are raised or lowered to their released or operative position.

What is claimed, is:—

The combination with a side delivery rake having a wheeled frame, a beam, and a rotary rake having a frame pivoted to the wheeled frame and projecting across and underneath said beam, of a caster wheel having a stem projecting loosely through openings arranged in vertical alinement in said beam and said rake frame, a collar on said stem between said beam and said rake frame, a helical spring on said stem above said collar and yieldingly supporting said beam, and means for raising and lowering said rake frame on said stem including a bell crank lever pivoted at its elbow to said stem above said beam, a manually operatable link connected to one leg of said bell crank lever, and a link terminally connected to the other leg of said bell crank lever and to said rake frame, said collar limiting vertical movement of said rake frame on said stem.

In testimony whereof, I affix my signature, in presence of two witnesses.

GEORGE W. DILLON.

Witnesses:
ERVIN E. SMITH,
ALONZO SILVERTHORN.

Copies of this patent may be obtained for five cents each, by addressing the "Commissioner of Patents, Washington, D. C."